United States Patent
Miyahara

(10) Patent No.: US 9,674,394 B2
(45) Date of Patent: Jun. 6, 2017

(54) IMAGE FORMING APPARATUS THAT ENSURES PROMPT START OF PRINTING MEDIUM SUPPLY, RECORDING MEDIUM, AND IMAGE FORMING METHOD

(71) Applicant: Kyocera Document Solutions Inc., Osaka (JP)

(72) Inventor: Norifumi Miyahara, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 13 days.

(21) Appl. No.: 15/081,851

(22) Filed: Mar. 26, 2016

(65) Prior Publication Data
US 2016/0286078 A1 Sep. 29, 2016

(30) Foreign Application Priority Data

Mar. 26, 2015 (JP) .................. 2015-065370

(51) Int. Cl.
*G06K 15/16* (2006.01)
*G06Q 30/04* (2012.01)
(Continued)

(52) U.S. Cl.
CPC ........... *H04N 1/342* (2013.01); *G06F 3/1296* (2013.01); *G06K 15/005* (2013.01); *G06K 15/16* (2013.01); *G06K 15/1823* (2013.01); *G06Q 20/30* (2013.01); *G06Q 30/0283* (2013.01); *G06Q 30/04* (2013.01); *H04N 1/0032* (2013.01); *H04N 1/00832* (2013.01); *H04N 1/32587* (2013.01); *H04N 1/60* (2013.01);
(Continued)

(58) Field of Classification Search
CPC .. H04N 1/342; H04N 1/32587; H04N 1/6016; H04N 1/00832; H04N 1/0032; H04N 1/60; H04N 2201/33378; H04N 2201/0094; G06Q 30/0283
See application file for complete search history.

(56) References Cited

U.S. PATENT DOCUMENTS 6,064,838 A 5/2000 Maruta et al.
2006/0152753 A1* 7/2006 Nakai .................. G03G 21/046
358/1.15

(Continued)

FOREIGN PATENT DOCUMENTS

JP 2013-088773 A 5/2013

*Primary Examiner* — John Wallace
*Assistant Examiner* — Darryl V Dottin
(74) *Attorney, Agent, or Firm* — James Judge

(57) ABSTRACT

An image forming apparatus includes a printer, a drawing data creating circuit, a medium supply circuit, and a printing amount managing circuit that manages a printing amount. The medium supply circuit performs a primary supply and a secondary supply. The medium supply circuit starts the primary supply prior to completion of creating drawing data. The drawing data creating circuit fixes a color for use in printing. The printing amount managing circuit changes the printing amount according to a specified color specified in the print data before the drawing data creating circuit fixes the color for use when the printing amount needs to be changed to start the primary supply. The printing amount managing circuit corrects the printing amount according to the color for use when the printing amount is changed according to the specified color.

9 Claims, 14 Drawing Sheets

(51) Int. Cl.
*G06Q 20/30* (2012.01)
*H04N 1/60* (2006.01)
*H04N 1/34* (2006.01)
*H04N 1/32* (2006.01)
*H04N 1/00* (2006.01)
*G06Q 30/02* (2012.01)
*G06F 3/12* (2006.01)
*G06K 15/00* (2006.01)
*G06K 15/02* (2006.01)

(52) U.S. Cl.
CPC ........... *H04N 1/6016* (2013.01); *G06K 15/40* (2013.01); *H04N 2201/0094* (2013.01); *H04N 2201/33378* (2013.01)

(56) References Cited

U.S. PATENT DOCUMENTS

| | | |
|---|---|---|
| 2009/0015865 A1 | 1/2009 | Tao et al. |
| 2013/0135683 A1* | 5/2013 | Sawada ................ H04N 1/6025 358/2.1 |

* cited by examiner ness by way of example and not by way of limitation.
IMAGE FORMING APPARATUS THAT ENSURES PROMPT START OF PRINTING MEDIUM SUPPLY, RECORDING MEDIUM, AND IMAGE FORMING METHOD

INCORPORATION BY REFERENCE

This application is based upon, and claims the benefit of priority from, corresponding Japanese Patent Application No. 2015-065370 filed in the Japan Patent Office on Mar. 26, 2015, the entire contents of which are incorporated herein by reference.

BACKGROUND

Unless otherwise indicated herein, the description in this section is not prior art to the claims in this application and is not admitted to be prior art by inclusion in this section.

There is proposed an image forming apparatus that includes a printing unit, a drawing data creating unit, and a medium supply unit. The printing unit performs printing on a printing medium. The drawing data creating unit creates drawing data, which causes the printing unit to perform printing, from print data. The medium supply unit supplies the printing medium to the printing unit. This medium supply unit performs a primary supply and a secondary supply. The primary supply supplies the printing medium to a specific position. The secondary supply supplies the printing medium from the specific position to the printing unit.

SUMMARY

An image forming apparatus according to an aspect of the disclosure includes a printer, a drawing data creating circuit, a medium supply circuit, and a printing amount managing circuit. The printer performs printing on a printing medium. The drawing data creating circuit creates drawing data from print data. The drawing data causes the printer to perform printing. The medium supply circuit supplies the printing medium to the printer. The printing amount managing circuit manages a printing amount. The medium supply circuit performs a primary supply and a secondary supply. The primary supply supplies the printing medium to a specific position. The secondary supply supplies the printing medium from the specific position to the printer. The medium supply circuit starts the primary supply prior to completion of creating the drawing data by the drawing data creating circuit. The drawing data creating circuit fixes a color for use in printing to create the drawing data. The printing is performed based on the drawing data by the printer. The printing amount managing circuit changes the printing amount according to a specified color specified in the print data before the drawing data creating circuit fixes the color for use when the printing amount needs to be changed to start the primary supply. The printing amount managing circuit corrects the printing amount according to the color for use when the printing amount is changed according to the specified color.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
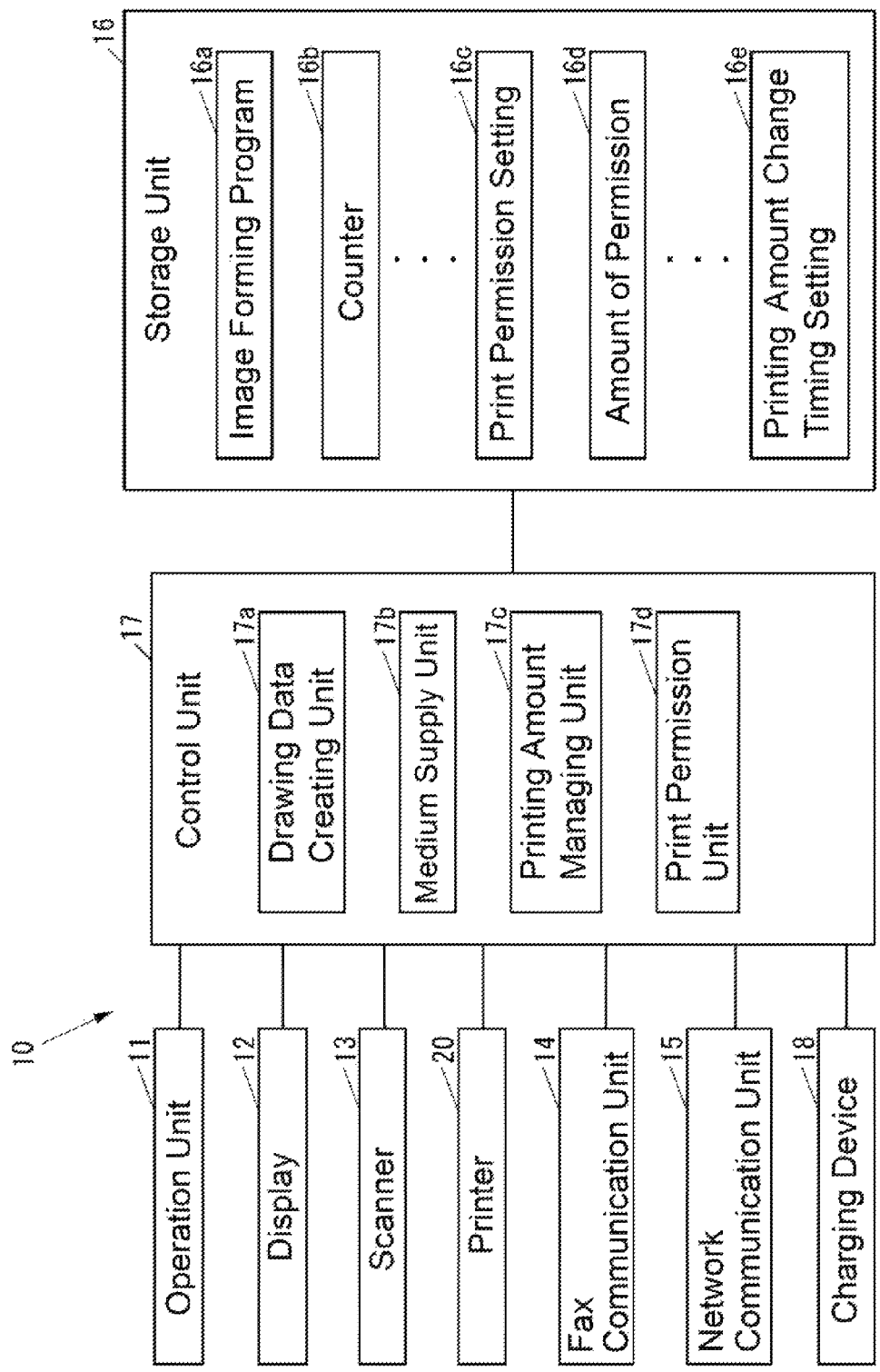
FIG. 1 illustrates a block diagram of an MFP according to an embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings. Additionally, the letter "S" attached before a numeral in the flowchart means a step.

First, the following describes a configuration of a multi-function peripheral (MFP) as an image forming apparatus according to the embodiment.

FIG. 1 illustrates a block diagram of an MFP 10 according to the embodiment.

As illustrated in FIG. 1, the MFP 10 includes an operation unit 11, a display 12, a scanner 13, a printer 20, a fax communication unit 14, a network communication unit 15, and a control unit 17, which controls the entire MFP 10. The operation unit 11 is an input device such as a button for inputting various operations. The display 12 is a display device, such as a LCD (liquid crystal display), which displays various pieces of information. The scanner 13, which is a reading device, reads images from a document. The printer 20, which is a print device, performs printing on a printing medium such as a paper sheet. The fax communication unit 14, which is a fax device, performs fax communications with an external facsimile device (not illustrated) via a communication line such as a dial-up line. The network communication unit 15, which is a network communication device, communicates with an external device via a network such as a LAN (local area network) and the Internet. The storage unit 16, which is a non-volatile storage device such as an EEPROM (electrically erasable programmable read only memory) and a HDD (hard disk drive), stores various pieces of information.

To the MFP 10, a charging device 18 is mountable. The charging device 18 performs charging on printing. The charging device 18 includes, for example, a coin vendor, which collects currency, such as coins, as a charging for printing each time printing is performed, and a key counter, which ensures measuring a printing amount and collectively charging for a plurality of printings.

Figure 2:
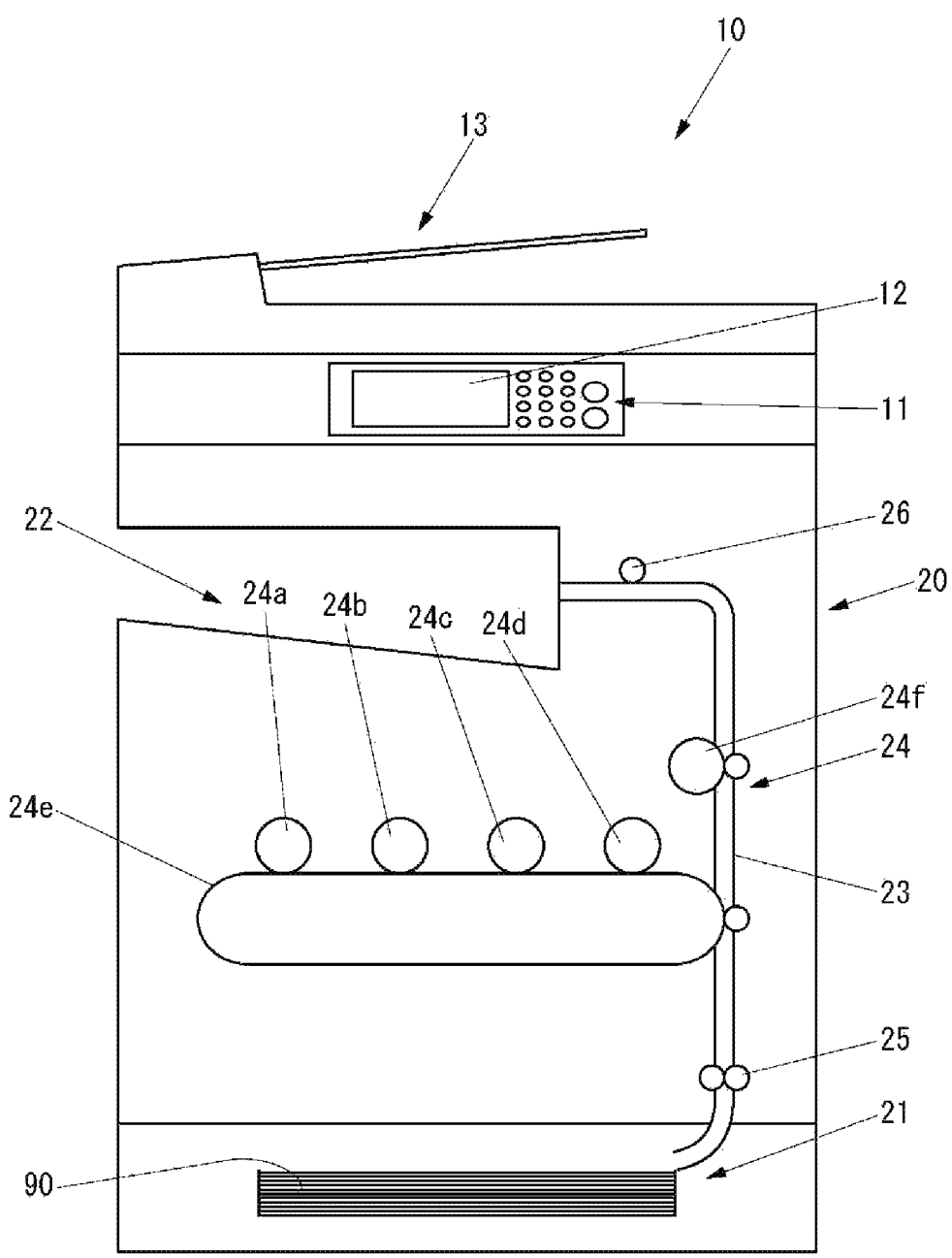
FIG. 2 schematically illustrates an internal structure of the MFP according to the embodiment.

FIG. 2 schematically illustrates a structure inside the MFP 10.

As illustrated in FIG. 2, the printer 20 includes a cassette 21, which supplies a printing medium 90, and a medium discharge unit 22 from which the printing medium 90 is discharged.

The printer 20 includes a conveyance path 23 for the printing medium 90 from the cassette 21 to the medium discharge unit 22. The printer 20 includes a large number of conveyance rollers (not illustrated) on the conveyance path 23. The conveyance rollers convey the printing medium 90 along the conveyance path 23.

The printer 20 includes a printing unit 24, which performs printing on the printing medium 90. The printing unit 24 includes photoreceptor drums 24a to 24d, a transfer belt 24e, and a fixing unit 24f. The photoreceptor drums 24a to 24d are photoreceptor drums for respective colors of cyan, magenta, yellow, and black, which form images on the surfaces with toner. After the images, which are formed on the surfaces of the photoreceptor drums 24a to 24d with the toner, are transferred to the surface of the transfer belt 24e, the transfer belt 24e transfers the images transferred on the surface with toner to the printing medium 90. The fixing unit 24f fixes the image transferred from the transfer belt 24e on the printing medium 90 with toner to the printing medium 90.

The printer 20 includes a registration roller 25 and a discharge sensor 26. The registration roller 25 adjusts a timing of conveying the printing medium 90 such that the image transferred on the surface of the transfer belt 24e with toner is appropriately transferred to the printing medium 90. The discharge sensor 26 detects the discharge of the printing medium 90 to the medium discharge unit 22.

The storage unit 16 includes areas to store programs and data. As illustrated in FIG. 1, the storage unit 16 stores an image forming program 16a to control the MFP 10. The image forming program 16a may be installed on the MFP 10 at the production stage of the MFP 10. The image forming program 16a may be additionally installed from an external storage medium, such as an SD card and a universal serial bus (USB) memory, on the MFP 10. The image forming program 16a may be additionally installed from a network on the MFP 10.

The storage unit 16 stores a counter 16b indicative of the printing amount. The counters 16b for color printing and for monochrome printing are prepared for each user, each group to which the users belong, and the entire MFP 10.

The storage unit 16 can store a print permission setting 16c. The print permission setting 16c is settable according to an instruction via the operation unit 11 or the network communication unit 15. The print permission setting 16c indicates the setting of whether to perform determination on permission for printing or not.

The storage unit 16 stores an amount of permission 16d for printing. The amounts of permission 16d for color printing and for monochrome printing are prepared for each user, each group to which the users belong, and the entire MFP 10. The amount of permission 16d is settable according to the instruction via the operation unit 11 or the network communication unit 15.

The storage unit 16 can store a printing amount change timing setting 16e. The printing amount change timing setting 16e indicates the setting of timing of changing the printing amount. The printing amount change timing setting 16e is settable according to the instruction via the operation unit 11 or the network communication unit 15. As settable timing by the printing amount change timing setting 16e, any of timings at which the conveyance of the printing medium 90 starts from the cassette 21 with the conveyance rollers of the printer 20 (hereinafter referred to as a "supply start timing") and at which the conveyance rollers of the printer 20 terminates the conveyance of the printing medium 90 to the medium discharge unit 22 (hereinafter referred to as a "discharge end timing") are settable. When the discharge end timing has been set, if opening the cover of the MFP 10 and removing the printing medium 90 to outside the MFP 10 after performing printing on the printing medium 90 by the printing unit 24 and before the already-printed printing medium 90 is discharged to the medium discharge unit 22, an incorrect operation of not changing the printing amount possibly occurs. When the supply start timing has been set, such incorrect operation can be prevented.

The control unit 17 includes, for example, a central processing unit (CPU), a read only memory (ROM), which stores programs and various data, and a random access memory (RAM) used as the work area for the CPU. The CPU executes the programs stored in the ROM or the storage unit 16.

By executing the image forming program 16a stored in the storage unit 16, which is a non-transitory computer-readable recording medium, the control unit 17 functions as a drawing data creating unit 17a (also referred to as a drawing data creating circuit), a medium supply unit 17b (also referred to as a medium supply circuit), a printing amount managing unit 17c (also referred to as a printing amount managing circuit), and a print permission unit 17d (also referred to as a print permission circuit). The drawing data creating unit 17a, the medium supply unit 17b, the printing amount managing unit 17c, and the print permission unit 17d may include a processor such as a central processing unit (CPU) including one or a plurality of circuits, can load the various programs to execute the programs and also can execute the various programs internally incorporated in advance. Here, the circuit can be an electronic component to which a plurality of electronic elements are connected through the wiring or an electronic substrate to which a plurality of electronic components are connected. The drawing data creating unit 17*a* creates drawing data, which causes the printing unit 24 to perform printing, from print data. The medium supply unit 17*b* supplies the printing medium 90 to the printing unit 24. The printing amount managing unit 17*c* manages the printing amount. The print permission unit 17*d* permits execution of printing by the printing unit 24.

To create the drawing data, the drawing data creating unit 17*a* fixes a color for use for printing performed based on the drawing data by the printing unit 24. That is, the drawing data creating unit 17*a* includes a color conversion module. For example, even if a specified color specified in the print data is color, when the color actually included in the image in the print data is only an achromatic color, the color for use in the drawing data created by the drawing data creating unit 17*a* based on the print data may be monochrome. That is, the color for use fixed by the drawing data creating unit 17*a* differs from the specified color specified in the print data in some cases.

Figure 3:
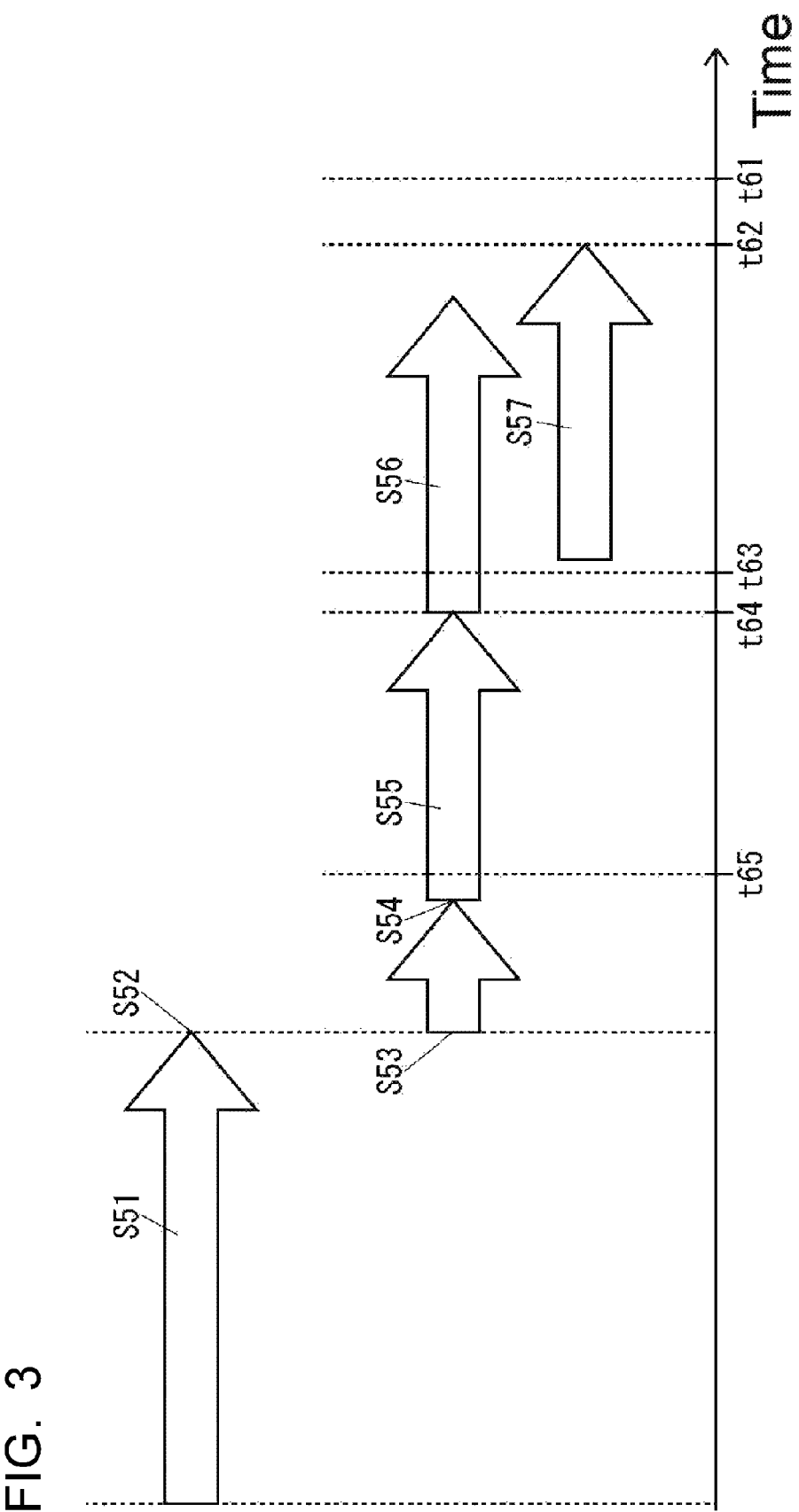
FIG. 3 illustrates an example of timings of various processes by a drawing data creating unit according to the embodiment.

FIG. 3 illustrates an example of timings of various processes by the drawing data creating unit 17*a*.

As illustrated in FIG. 3, the external device creates the print data (S51). The external device starts transmission of the created print data to the MFP 10 (S52). Accordingly, the control unit 17 of the MFP 10 starts receiving the print data transmitted from the external device (S53). The control unit 17 starts a job of printing based on the received print data (S54). Then, when performing the job started at S54, the drawing data creating unit 17*a* of the control unit 17 creates intermediate image data based on the print data (S55). The drawing data creating unit 17*a* rasterizes the intermediate image data created at S55 (S56). The drawing data creating unit 17*a* performs a color conversion process on the rasterized image data (S57) to create drawing data.

Figure 4:
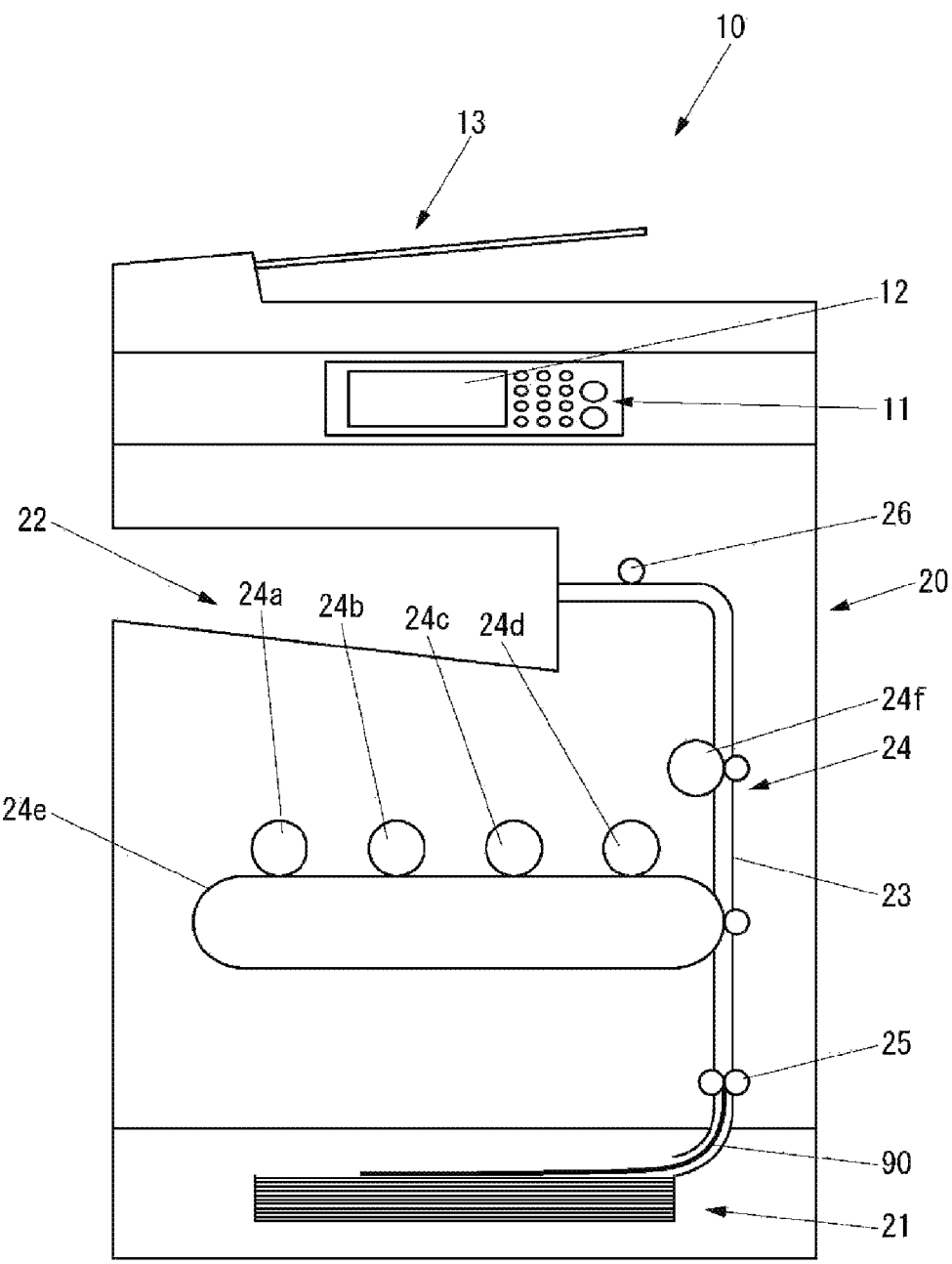
FIG. 4 schematically illustrates the MFP according to the embodiment at a time point of completing execution of a primary supply.
Figure 5:
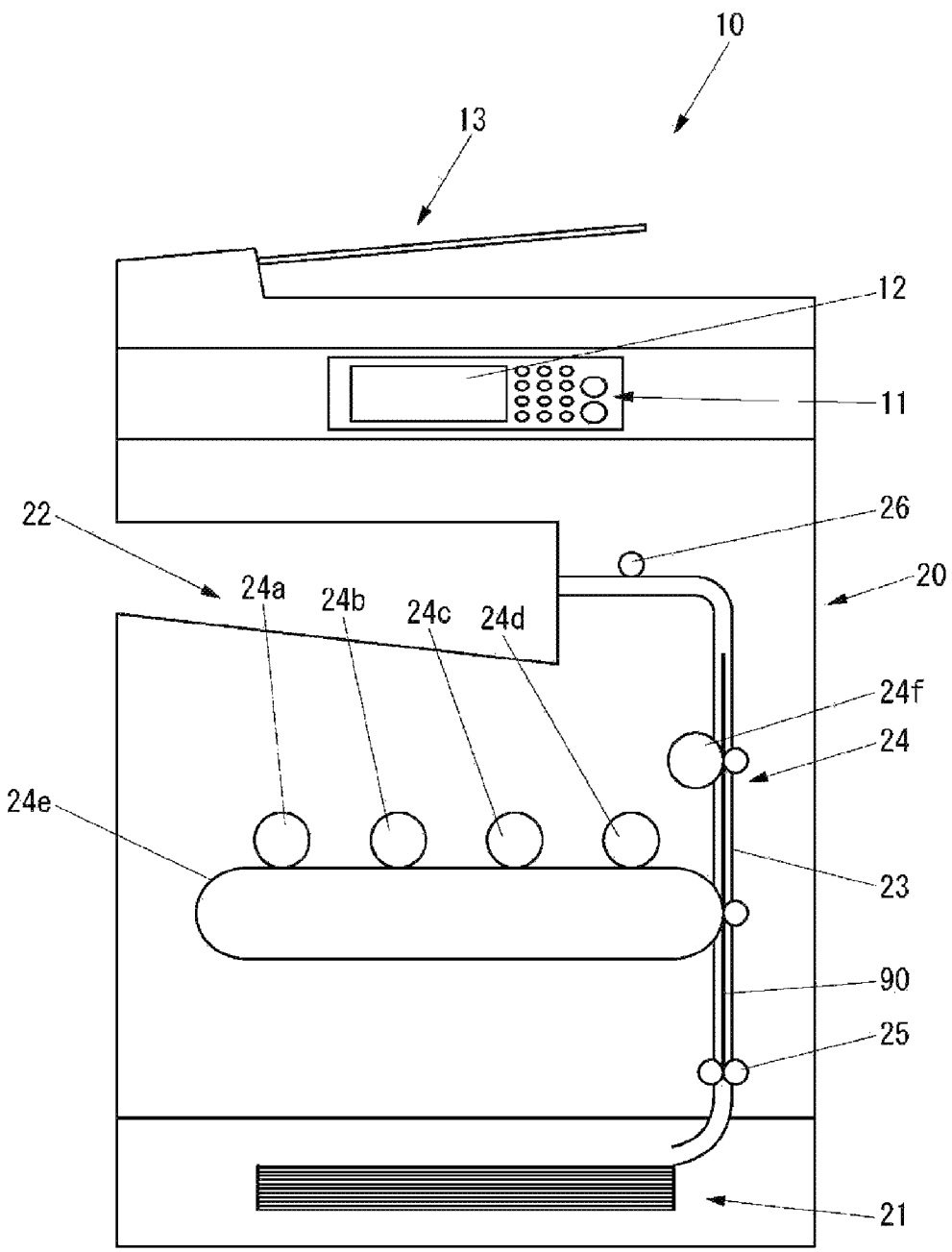
FIG. 5 schematically illustrates the MFP according to the embodiment while a secondary supply is in execution.

The medium supply unit 17*b* illustrated in FIG. 1 performs a primary supply and a secondary supply. As illustrated in FIG. 4, when the medium supply unit 17*b* performs the primary supply, the medium supply unit 17*b* controls the conveyance rollers to supply the printing medium 90 from the cassette 21 to a specific position, namely, a position of the registration roller 25. As illustrated in FIG. 5, when the medium supply unit 17*b* performs the secondary supply, the medium supply unit 17*b* controls the registration roller 25 and the conveyance rollers to supply the printing medium 90 from the position of the registration roller 25 to the printing unit 24 and then discharges the printing medium 90 to the medium discharge unit 22.

The MFP 10 advances the printing medium 90 up to the position of the registration roller 25 beforehand by the primary supply. As soon as preparation of a printing process, such as creation of the drawing data by the drawing data creating unit 17*a*, is completed, the MFP 10 ensures execution of printing to the printing medium 90 by the printing unit 24 immediately by the secondary supply. Accordingly, the MFP 10 ensures improving a printing speed.

In the example illustrated in FIG. 3, for example, the secondary supply starts at a timing t61. The drawing data created by the color conversion process at S57 is compressed at a timing t62 where the color conversion process at S57 is terminated. Accordingly, the control unit 17 needs to perform the preparatory work before printing by the printing unit 24. The preparatory work includes, for example, decompression of the drawing data created by the color conversion process at S57, adjustment of the position of the drawing data based on margins set to the print data, and rotation of the drawing data corresponding to the rotation direction set to the print data. The control unit 17 performs processes on each area (band) formed by dividing the drawing data into a plurality of areas. The medium supply unit 17*b* starts the secondary supply at a phase of completing the preparatory work by, for example, two bands. Accordingly, the timing t61 where the secondary supply starts is after the timing t62 where the color conversion process at S57 is terminated. The control unit 17 performs preparatory work for the remaining bands concurrently with the secondary supply.

In the example illustrated in FIG. 3, for example, the primary supply starts at any of the timing t62 where the color conversion process at S57 is terminated and a timing t63, which is previous of the timing t62. As long as the timing t63 where the primary supply starts is prior to the timing t62, the timing t63 may not be the timing illustrated in FIG. 3. For example, the timing t63 may be at the start of the process at S56. However, assume that, when the MFP 10 can supply the printing medium 90 from a plurality of suppliers, the MFP 10 has a configuration of fixing the size of the printing medium 90 at S55 and further has a configuration of deciding the supplier, which performs the primary supply based on the fixed size. The timing t63 where the primary supply starts needs to be later than a timing t64 where the process at S55 is terminated.

The control unit 17 starts preparation of the printing unit 24, such as starting warming the fixing unit 24*f*, for example, at a timing t65, which is near the start timing of the process at S55. The timing t65 may be prior to the start timing of the process at S55, may be at the start timing of the process at S55, or may be after the start timing of the process at S55.

Next, the following describes operations of the MFP 10.

Figure 6:
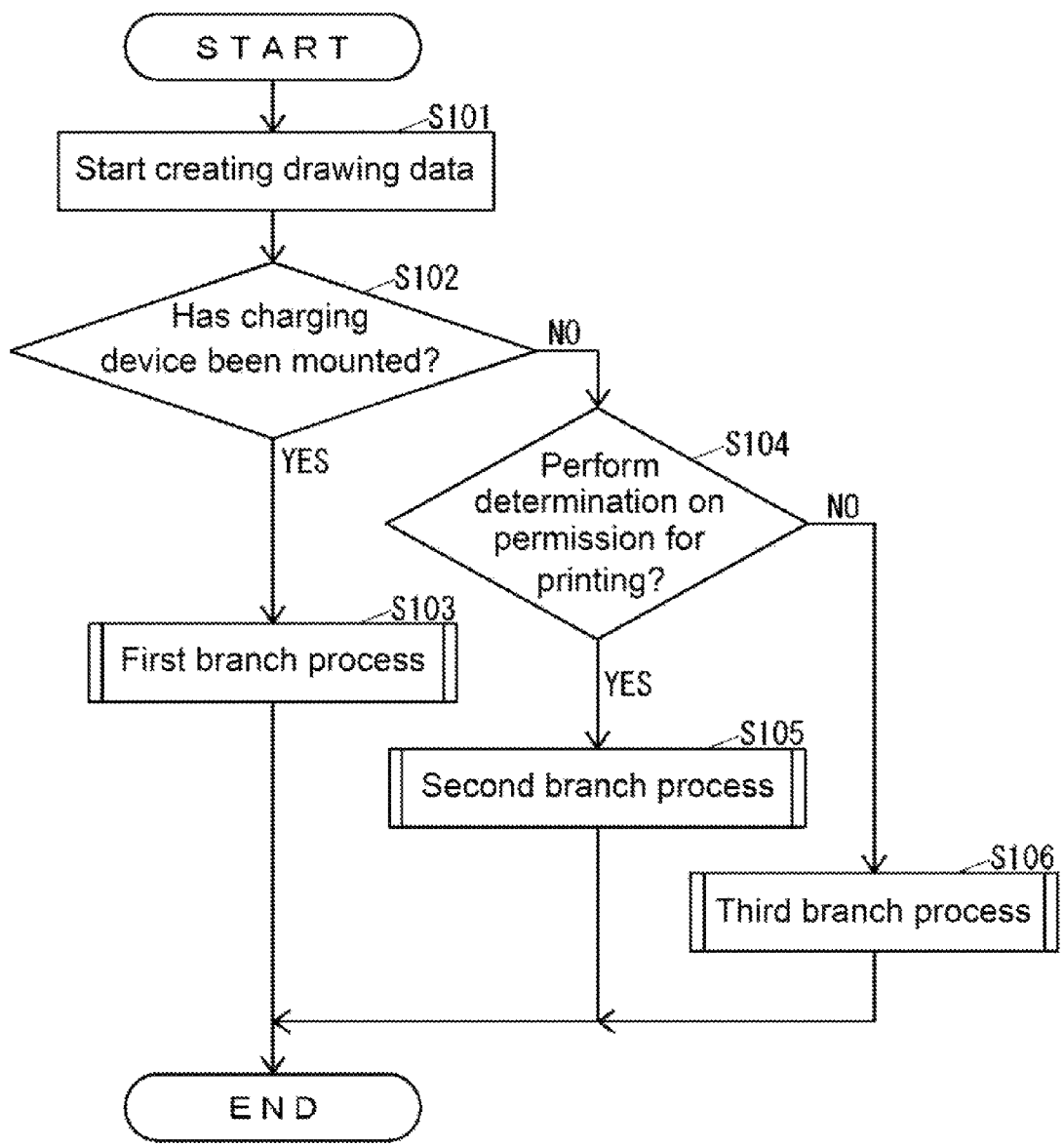
FIG. 6 illustrates operations of the MFP according to the embodiment to perform printing according to print data.

FIG. 6 illustrates the operations of the MFP 10 to perform printing according to the print data.

As illustrated in FIG. 6, the drawing data creating unit 17*a* starts creating the drawing data based on the print data received from the external device via the network communication unit 15 or the print data input from an external storage medium such as a USB flash drive (S101).

After the process at S101, the medium supply unit 17*b* determines whether the charging device 18 has been mounted to the MFP 10 or not (S102).

Figure 7:
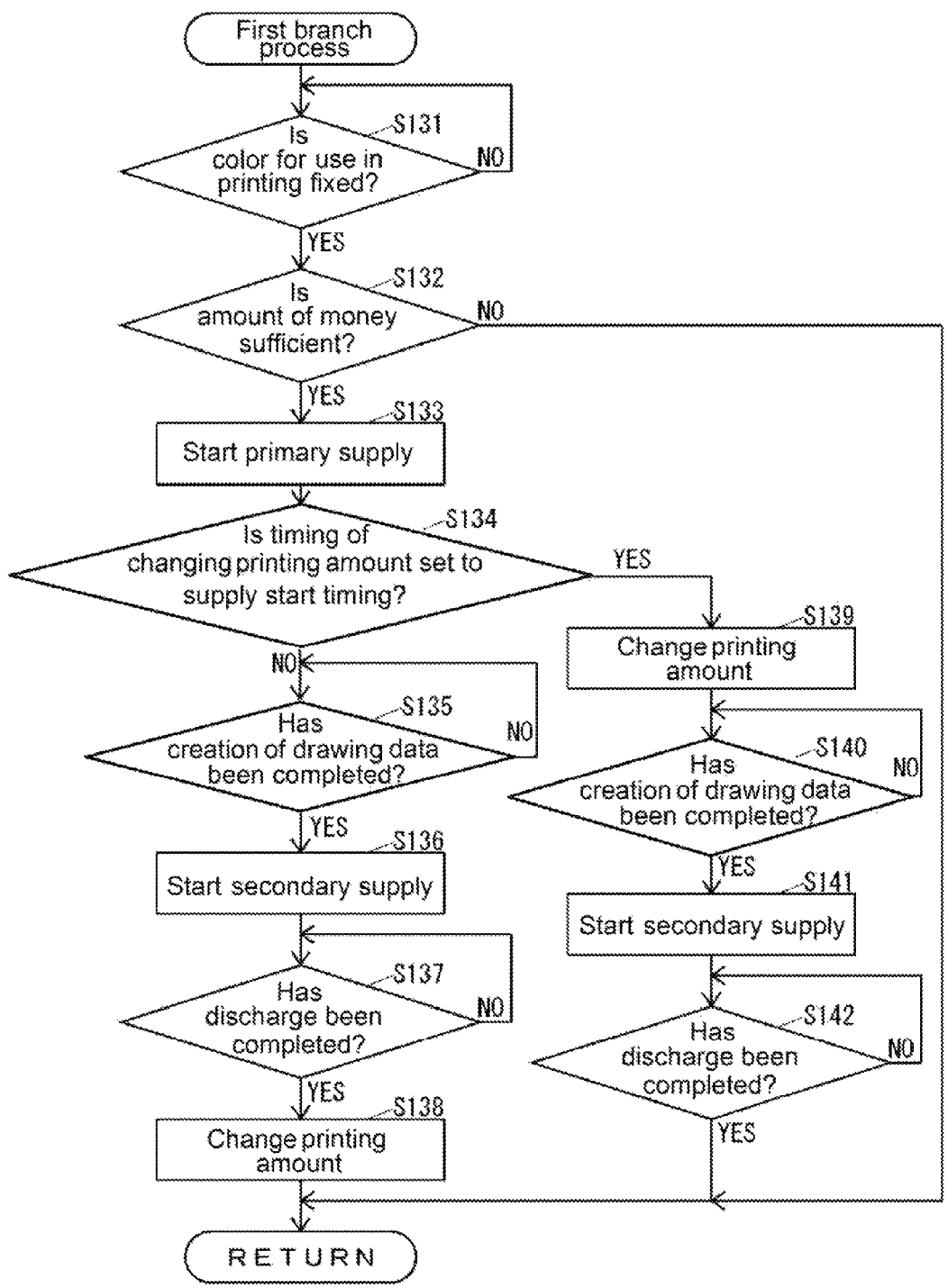
FIG. 7 illustrates a first branch process according to the embodiment.

When the medium supply unit 17*b* determines that the charging device 18 has been mounted at S102, the control unit 17 performs a first branch process (S103) illustrated in FIG. 7 and terminates the operations illustrated in FIG. 6.

FIG. 7 illustrates the first branch process.

As illustrated in FIG. 7, the drawing data creating unit 17*a* determines whether the color for use has been fixed or not until the drawing data creating unit 17*a* determines that the color for use in the printing performed based on the drawing data by the printing unit 24 has been fixed (S131).

When the drawing data creating unit 17*a* determines that the color for use has been fixed at S131, the medium supply unit 17*b* determines whether the amount of money that the charging device 18 receives is sufficient or not (S132) to perform printing based on the drawing data by the printing unit 24. Here, the medium supply unit 17*b* decides the amount of money required for printing, which is performed based on the drawing data by the printing unit 24, based on the number of sheets of the drawing data created by the drawing data creating unit 17*a* and the color for use fixed by the drawing data creating unit 17*a*. For example, the amount of money charged for printing of color printing per sheet is set higher than that of the monochrome printing.

When the medium supply unit 17*b* determines that the amount of money is insufficient at S132, the medium supply unit 17*b* terminates the operations illustrated in FIG. 7.

When the medium supply unit 17b determines that the amount of money is sufficient at S132, the primary supply is started (S133).

Next, the printing amount managing unit 17c determines whether the timing of changing the printing amount is the supply start timing or not based on the printing amount change timing setting 16e (S134).

When the printing amount managing unit 17c determines that the timing of changing the printing amount is not the supply start timing, namely, the discharge end timing at S134, the drawing data creating unit 17a determines whether the creation of the drawing data has been completed or not until the drawing data creating unit 17a determines that the creation of the drawing data, which has been started at S101, has been completed (S135).

When the drawing data creating unit 17a determines that the creation of the drawing data has been completed at S135, the medium supply unit 17b starts the secondary supply (S136). Here, the control unit 17 performs printing by the printing unit 24 based on the drawing data, which is created by the drawing data creating unit 17a on the printing medium 90 conveyed in the secondary supply.

Next, the medium supply unit 17b determines whether the discharge of the printing medium 90 to the medium discharge unit 22 has been completed or not based on the detection result by the discharge sensor 26 until the medium supply unit 17b determines that the discharge of the printing medium 90 to the medium discharge unit 22 has been completed (S137).

When the medium supply unit 17b determines that the discharge of the printing medium 90 to the medium discharge unit 22 has been completed at S137, the printing amount managing unit 17c changes the amounts of printing of the user, the group to which the user belongs, and the entire MFP 10, which are indicated by the counter 16b, based on the number of sheets of the drawing data created by the drawing data creating unit 17a and the color for use fixed by the drawing data creating unit 17a (S138). Then, the printing amount managing unit 17c terminates the operations illustrated in FIG. 7.

Figure 8:
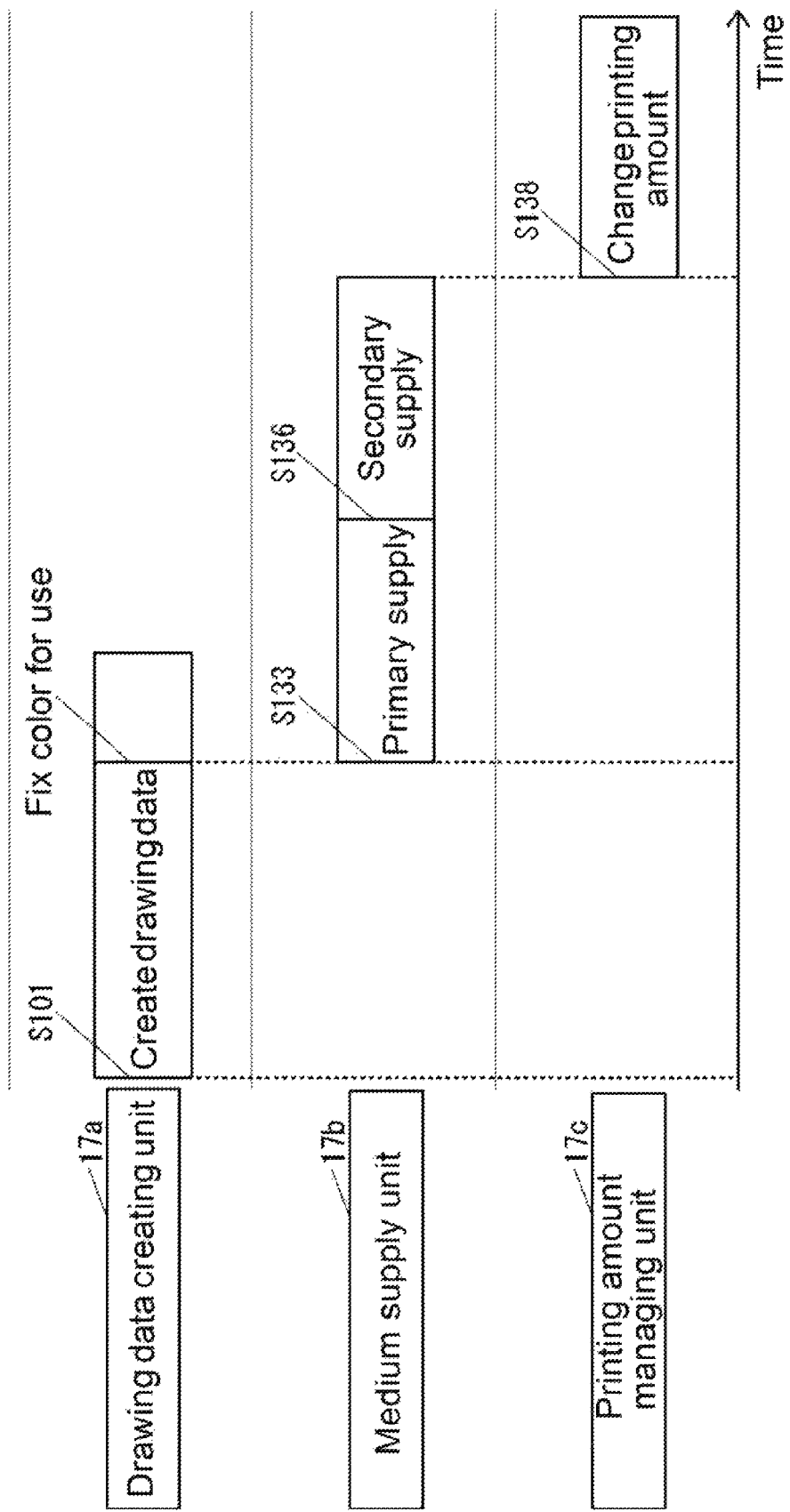
FIG. 8 illustrates timings of each operation by the MFP according to the embodiment when a charging device is mounted and a timing of changing a printing amount is a discharge end timing.

FIG. 8 illustrates timings of each operation by the MFP 10 when the charging device 18 is mounted and the timing of changing the printing amount is the discharge end timing.

As illustrated in FIG. 8, assume the case where the charging device 18 is mounted and the timing of changing the printing amount is the discharge end timing. Only when the charging device 18 performs charging, such as when the coin bender changes coins by the required amount of money, the primary supply is started. Accordingly, the primary supply is started after the drawing data creating unit 17a fixes the color for use. The change of the printing amount is started after completing the secondary supply.

The start timing of the primary supply in FIG. 8 corresponds to the timing t62 illustrated in FIG. 3. The start timing of the secondary supply in FIG. 8 corresponds to the timing t61 illustrated in FIG. 3.

As illustrated in FIG. 7, when the printing amount managing unit 17c determines that the timing of changing the printing amount is the supply start timing at S134, similar to the process at S138, the printing amount managing unit 17c changes the printing amount of the entire MFP 10 indicated by the counter 16b (S139).

Next, similar to the processes at S135 to S137, the control unit 17 performs the processes at S140 to S142 and terminates the operations illustrated in FIG. 7.

Figure 9:
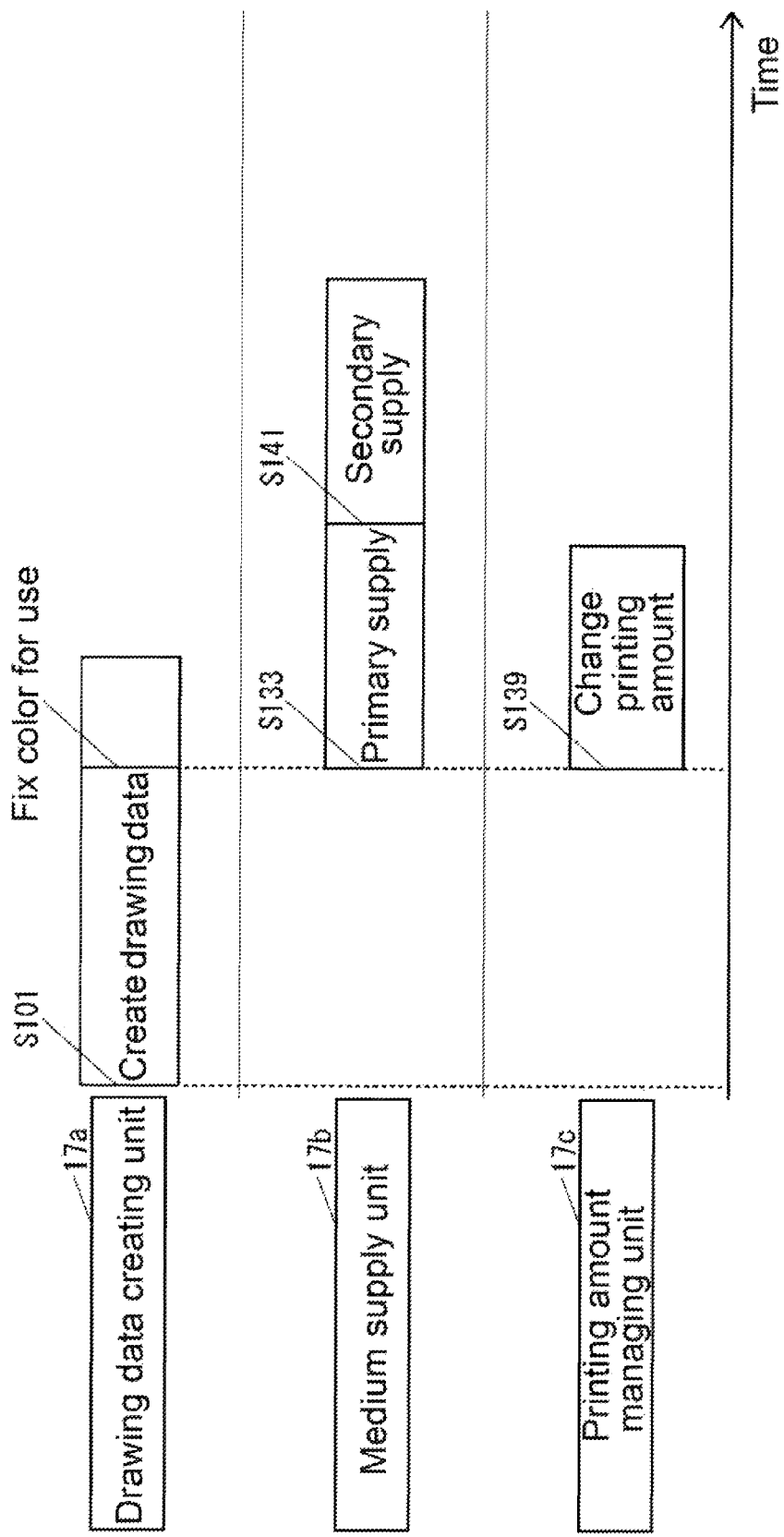
FIG. 9 illustrates timings of each operation by the MFP according to the embodiment when the charging device is mounted and the timing of changing the printing amount is a supply start timing.

FIG. 9 illustrates timings of each operation by the MFP 10 when the charging device 18 is mounted and the timing of changing the printing amount is the supply start timing.

As illustrated in FIG. 9, assume that the charging device 18 is mounted and the timing of changing the printing amount is the supply start timing. Only when the charging device 18 charges, the primary supply is started. Accordingly, the primary supply is started after the drawing data creating unit 17a fixes the color for use. The change of the printing amount is also started after the drawing data creating unit 17a fixes the color for use.

The start timing of the primary supply in FIG. 9 corresponds to the timing t62 illustrated in FIG. 3. The start timing of the secondary supply in FIG. 9 corresponds to the timing t61 illustrated in FIG. 3.

As illustrated in FIG. 6, when the medium supply unit 17b determines that the charging device 18 is not mounted at S102, the print permission unit 17d determines whether to perform determination on the permission for printing or not based on the print permission setting 16c (S104).

Figure 10:
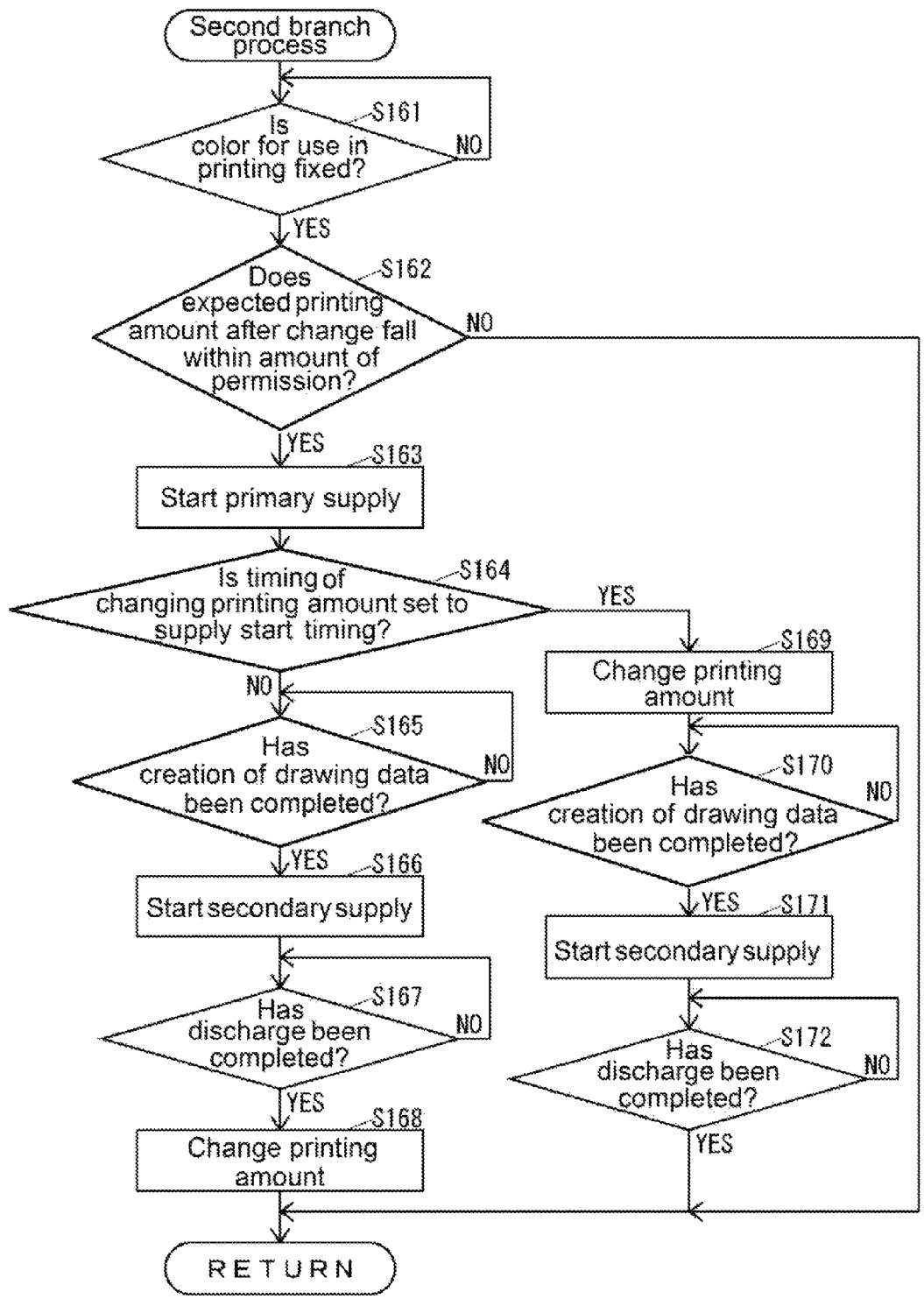
FIG. 10 illustrates a second branch process according to the embodiment.

When the print permission unit 17d determines the execution of determination on permission for printing at S104, the control unit 17 performs a second branch process (S105) illustrated in FIG. 10 and terminates the operations illustrated in FIG. 6.

FIG. 10 illustrates the second branch process.

As illustrated in FIG. 10, similar to the process at S131 in FIG. 7, the control unit 17 performs the process at S161.

When the control unit 17 determines that color for use has been fixed at S161, to permit execution of printing based on the drawing data by the printing unit 24, the print permission unit 17d determines whether the sum of the current printing amount, which is indicated by the counter 16b, and the amount of change to be generated in the printing amount by printing to be performed by the printing unit 24 falls within the amount of permission 16d or not (S162). Here, based on the number of sheets of the drawing data created by the drawing data creating unit 17a and the color for use fixed by the drawing data creating unit 17a, the print permission unit 17d decides the amount of change to be generated in the printing amount when performing print based on the drawing data by the printing unit 24. When the color for use fixed by the drawing data creating unit 17a is color, the amount of change occurs in the printing amount indicated by the counter 16b for color printing. When the color for use fixed by the drawing data creating unit 17a is monochrome, the amount of change occurs in the printing amount indicated by the counter 16b for monochrome printing. Then, the print permission unit 17d determines whether the printing amount falls within the amount of permission 16d or not even if the amount of change is added to the current amounts of printing of the respective user and group to which the user belongs based on the current printing amount, which is indicated by the counter 16b, and the amount of permission 16d.

When the print permission unit 17d determines that the printing amount does not fall within at S162, the print permission unit 17d terminates the operations illustrated in FIG. 10.

When the print permission unit 17d determines that the printing amount falls within at S162, similar to the processes at S133 to S142 in FIG. 7, the control unit 17 performs the processes at S163 to S172 and terminates the operations illustrated in FIG. 10.

Assume the case where the determination on permission for printing is performed and the timing of changing the printing amount is the discharge end timing. Only when the printing is permitted, the primary supply is started. Therefore, similar to the case where the charging device 18 is mounted and the timing of changing the printing amount is the discharge end timing, as illustrated in FIG. 8, the primary supply is started after the drawing data creating unit 17*a* fixes the color for use. The change of the printing amount is started after completing the secondary supply.

Assume the case where the determination on permission for printing is performed and the timing of changing the printing amount is the supply start timing. Only when the printing is permitted, the primary supply is started. Therefore, similar to the case where the charging device 18 is mounted and the timing of changing the printing amount is the discharge start timing, as illustrated in FIG. 9, the primary supply is started after the drawing data creating unit 17*a* fixes the color for use. The change of the printing amount is also started also started after the drawing data creating unit 17*a* fixes the color for use.

Figure 11A:
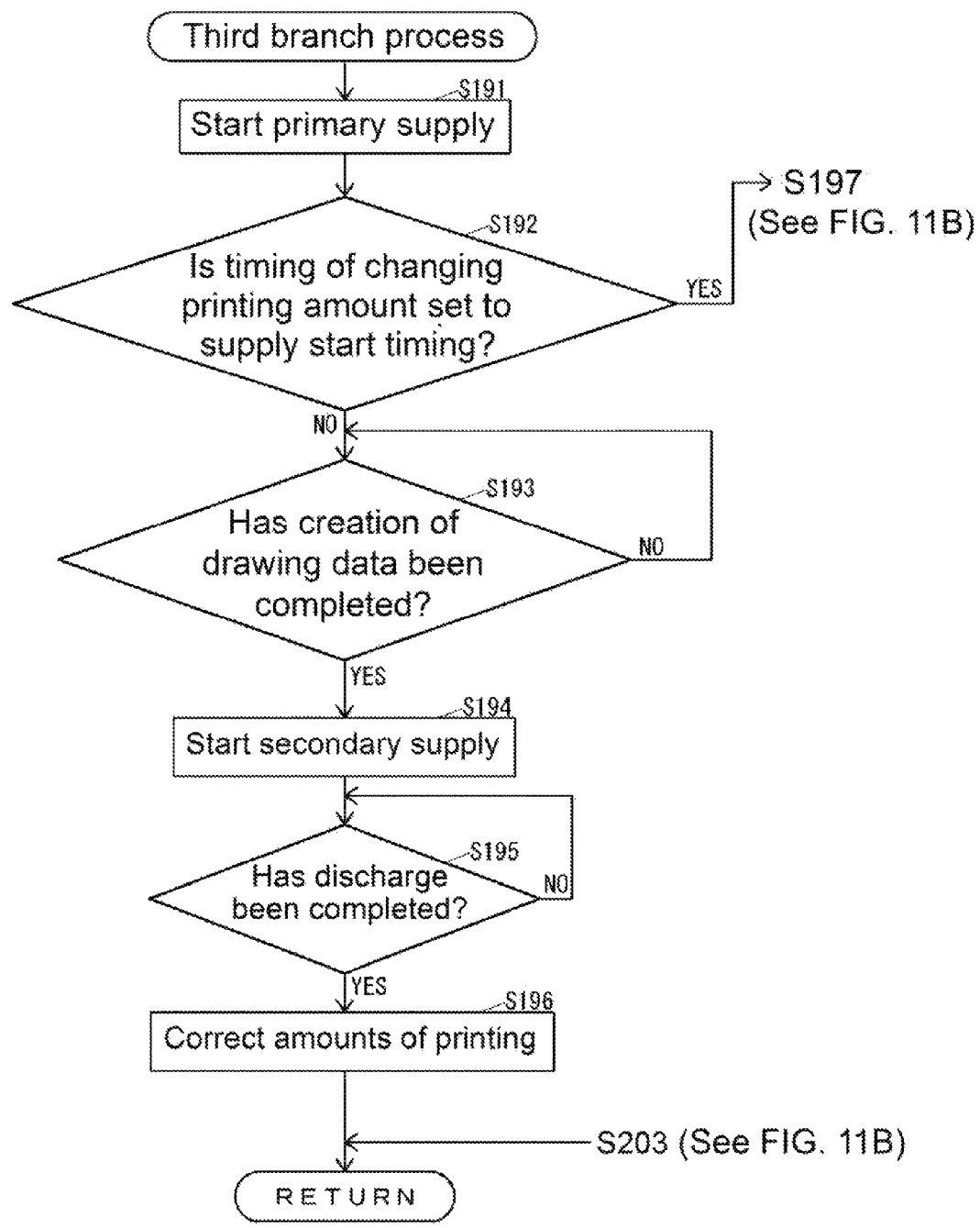
FIGS. 11A and 11B illustrate a third branch process according to the embodiment.
Figure 11B:
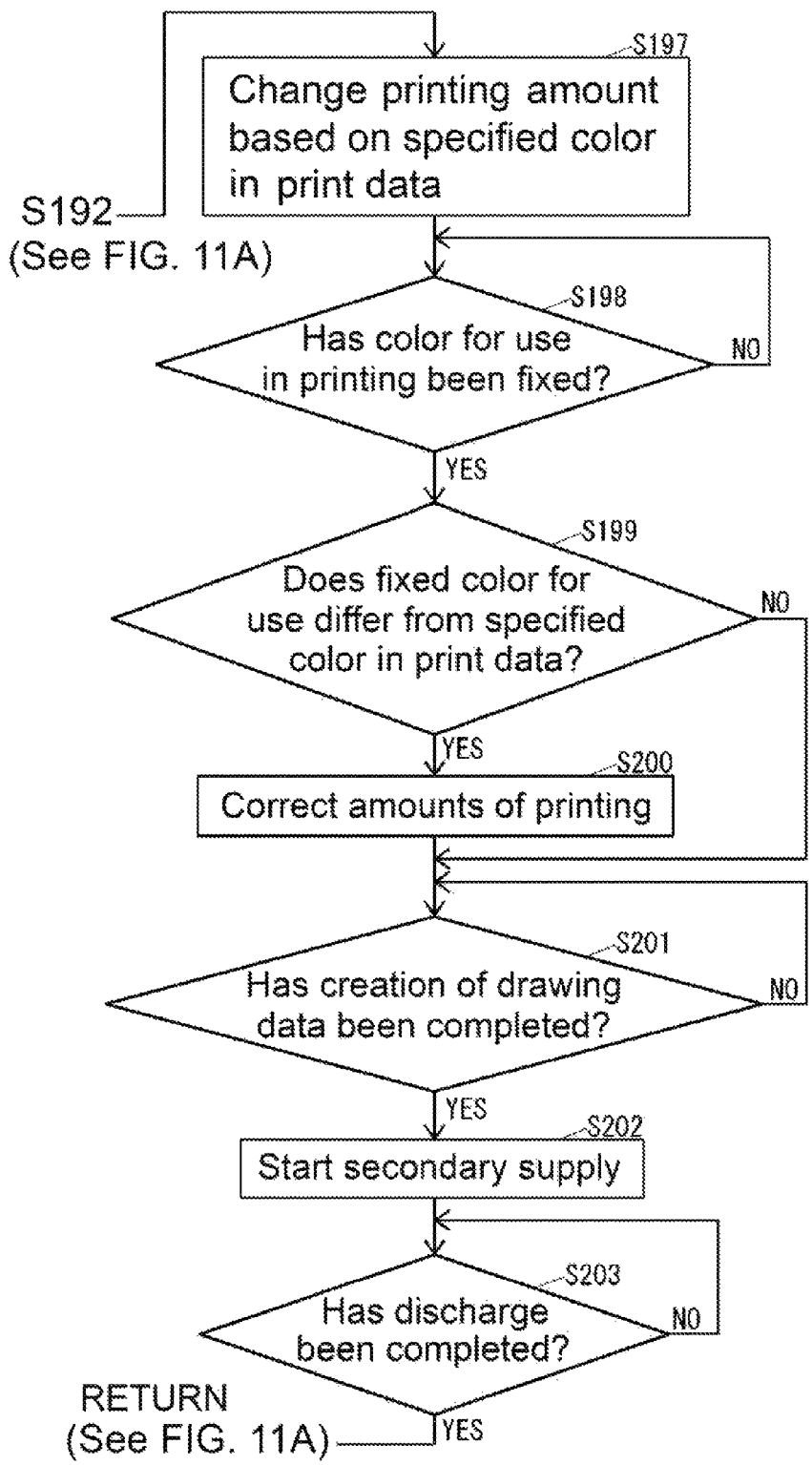

As illustrated in FIG. 6, when the print permission unit 17*d* determines no determination on permission for printing at S104, the control unit 17 executes a third branch process (S106) illustrated in FIGS. 11A and 11B and terminates the operations illustrated in FIG. 6.

FIGS. 11A and 11B illustrate the third branch process.

As illustrated in FIG. 11A, similar to the processes at S133 to S138 in FIG. 7, the control unit 17 performs the processes at S191 to S196 and terminates the operations illustrated in FIGS. 11A and 11B.

Figure 12:
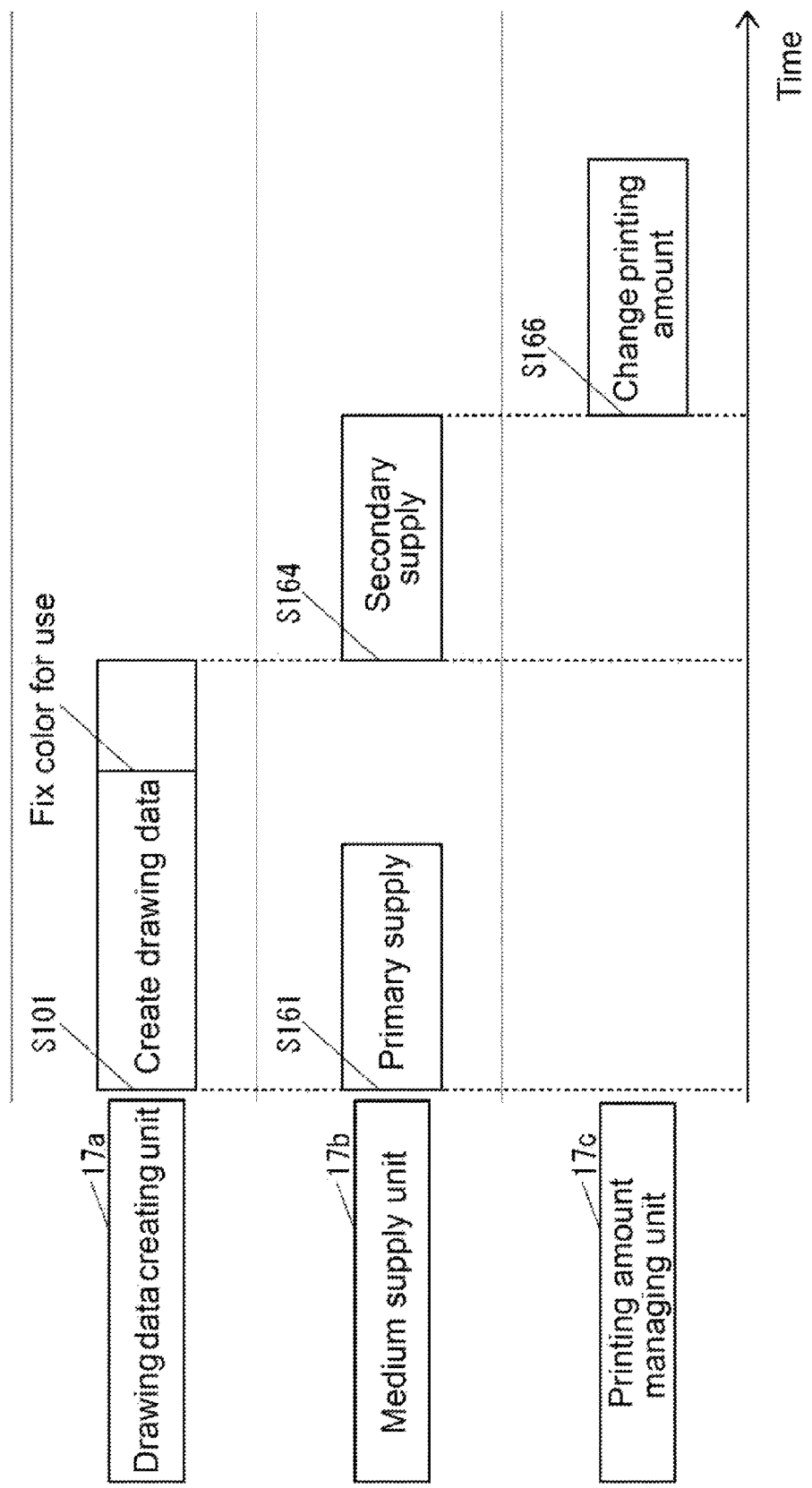
FIG. 12 illustrates timings of respective operations by the MFP according to the embodiment when the charging device is not mounted, determination on permission for printing is not performed, and the timing of changing the printing amount is the discharge end timing.

FIG. 12 illustrates timings of each operation by the MFP 10 when the charging device 18 is not mounted, the determination on permission for printing is not performed, and the timing of changing the printing amount is the discharge end timing.

As illustrated in FIG. 12, when the charging device 18 is not mounted, the determination on permission for printing is not performed, and the timing of changing the printing amount is the discharge end timing, the primary supply starts at the time point of starting creating the drawing data by the drawing data creating unit 17*a*. The change of the printing amount is started after completing the secondary supply.

The start timing of the primary supply in FIG. 12 corresponds to the timing t63 illustrated in FIG. 3. The start timing of the secondary supply in FIG. 12 corresponds to the timing t61 illustrated in FIG. 3.

As illustrated in FIGS. 11A and 11B, when the timing of changing the printing amount is determined as the supply start timing at S192, the printing amount managing unit 17*c* changes the amounts of printing of the user, the group to which the user belongs, and the entire MFP 10, which are indicated by the counter 16*b*, based on the number of printed sheets specified in the print data and the specified color specified in the print data (S197).

Next, the drawing data creating unit 17*a* determines whether the color for use has been fixed or not until the drawing data creating unit 17*a* determines that the color for use in the printing performed based on the drawing data by the printing unit 24 has been fixed (S198).

When the drawing data creating unit 17*a* determines that the color for use has been fixed at S198, the printing amount managing unit 17*c* determines whether the color for use fixed by the drawing data creating unit 17*a* differs from the specified color specified in the print data or not (S199).

When the printing amount managing unit 17*c* determines that the color for use differs from the specified color at S199, the printing amount managing unit 17*c* corrects the amounts of printing of the user, the group to which the user belongs, and the entire MFP 10, which are indicated by the counter 16*b*, based on the number of sheets of the drawing data created by the drawing data creating unit 17*a* and the color for use fixed by the drawing data creating unit 17*a* (S200).

When the printing amount managing unit 17*c* determines that the color for use does not differ from the specified color at S199 or the process at S200 is terminated, the drawing data creating unit 17*a* determines whether the creation of the drawing data has been completed or not until the drawing data creating unit 17*a* determines that the creation of the drawing data, which is started at S101, has been completed (S201).

When the drawing data creating unit 17*a* determines that the creation of the drawing data has been completed at S201, the medium supply unit 17*b* starts the secondary supply (S202). Here, the control unit 17 performs printing by the printing unit 24 based on the drawing data, which is created by the drawing data creating unit 17*a* on the printing medium 90 conveyed in the secondary supply.

Next, the medium supply unit 17*b* determines whether the discharge of the printing medium 90 to the medium discharge unit 22 has been completed or not based on the detection result by the discharge sensor 26 until the medium supply unit 17*b* determines that the discharge of the printing medium 90 to the medium discharge unit 22 has been completed (S203).

When the medium supply unit 17*b* determines that the discharge of the printing medium 90 to the medium discharge unit 22 has been completed at S203, the medium supply unit 17*b* terminates the operations illustrated in FIGS. 11A and 11B.

Figure 13:
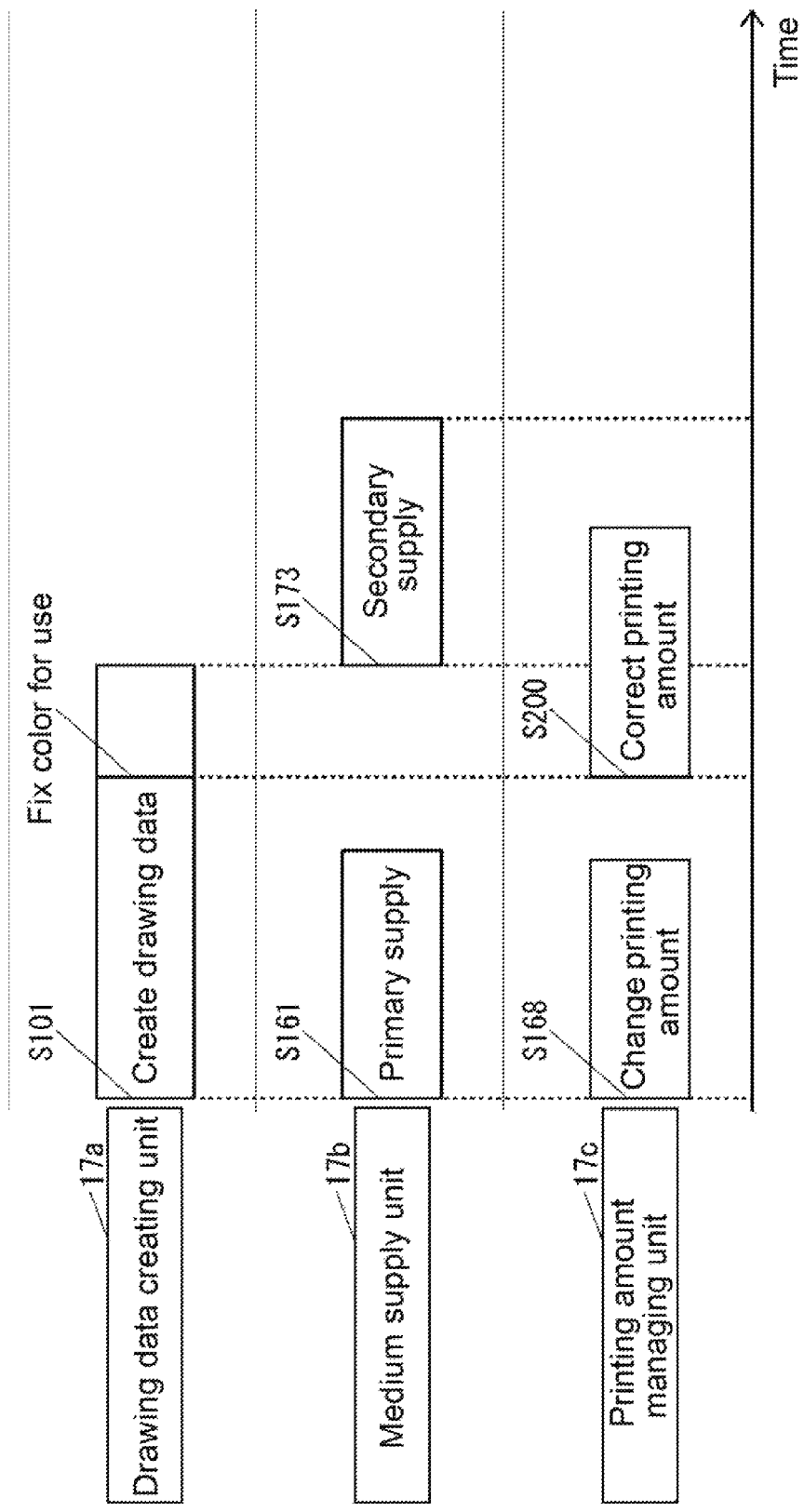
FIG. 13 illustrates timings of each operation by the MFP according to the embodiment when the charging device is not mounted, the determination on permission for printing is not performed, and the timing of changing the printing amount is the supply start timing.

FIG. 13 illustrates timings of each operation by the MFP 10 when the charging device 18 is not mounted, the determination on permission for printing is not performed, and the timing of changing the printing amount is the supply start timing.

As illustrated in FIG. 13, when the charging device 18 is not mounted, the determination on permission for printing is not performed, and the timing of changing the printing amount is the supply start timing, the primary supply and the change of the printing amount start at the time point of starting creating the drawing data by the drawing data creating unit 17*a*. The printing amount is possibly corrected after fixing the color for use by the drawing data creating unit 17*a*. While the timing of changing the printing amount is the supply start timing (YES at S192), if the change of the printing amount (S197) is not performed based on the specified color specified in the print data, as illustrated in FIG. 9, the primary supply does not start until the color for use is fixed. However, when the timing of changing the printing amount is the supply start timing (YES at S192), the MFP 10 changes the printing amount based on the specified color specified in the print data (S197). As illustrated in FIG. 13, the timing of starting the primary supply is settable to the timing identical to the case of the timing of changing the printing amount being the discharge end timing (see FIG. 12). That is, when the charging device 18 is not mounted and the determination on permission for printing is not performed, the MFP 10 does not depend on the timing of changing the printing amount and uniforms the timing of starting the primary supply. This ensures improving the performance.

The start timing of the primary supply in FIG. 13 corresponds to the timing t63 illustrated in FIG. 3. The start timing of the secondary supply in FIG. 13 corresponds to the timing t61 illustrated in FIG. 3.

As described above, before the color for use in printing performed by the printing unit 24 based on the drawing data is fixed (YES at S198), the MFP 10 corrects the printing amount corresponding to the specified color specified in the print data (S197). After that, the MFP 10 changes printing amount corresponding to the fixed color for use (S200). Therefore, even if the printing amount needs to be changed to start supplying the printing medium 90 (YES at S192), the printing medium 90 is configured to start supplying before the color for use is fixed. Accordingly, even if the printing amount needs to be changed to start supplying the printing medium 90, the MFP 10 is configured to promptly start supplying the printing medium 90.

With the embodiment, to perform determination on permission for printing (YES at S104), the MFP 10 performs the determination on permission for printing based on the amount of change corresponding to the color for use fixed by the drawing data creating unit 17a (S162). However, when the printing amount is less than the amount of permission 16d by a specific amount or more, before the drawing data creating unit 17a fixes the color for use, the print permission unit 17d may permit the printing unit 24 to perform printing based on the amount of change corresponding to the specified color specified in the print data. With this configuration, the MFP 10 ensures permitting printing by the printing unit 24 before fixing the color for use. This ensures starting the supply of the printing medium 90 promptly.

While the image forming apparatus of the disclosure is an MFP in this embodiment, the image forming apparatus may be an image forming apparatus other than the MFP such as a printer-only machine, as long as the image forming apparatus performs printing based on print data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
a printer that performs printing on a printing medium;
a drawing data creating circuit that by rasterizing and color-converting print data creates drawing data from print data, the drawing data causing the printer to perform printing;
a medium supply circuit that supplies the printing medium to the printer; and
a printing amount managing circuit that manages a printing amount; wherein
the medium supply circuit performs
a primary supply supplying the printing medium to a specific position, the medium supply circuit starting the primary supply prior to the drawing data creating circuit completing creation of drawing data, and
a secondary supply supplying the printing medium from the specific position to the printer, the medium supply circuit starting the secondary supply prior to the drawing data creating circuit completing creation of the drawing data;
the drawing data creating circuit in creating the drawing data fixes a job hue within the drawing data in printing, the printing being performed by the printer based on the drawing data;
the printing amount managing circuit changes the printing amount according to a designated hue specified in the print data before the drawing data creating circuit fixes the job hue when the printing amount needs to be changed to start the primary supply; and
the printing amount managing circuit, with the job hue having been fixed, corrects the printing amount according to the job hue after the printing amount is changed according to the designated hue.

2. The image forming apparatus according to claim 1, further comprising a print permission circuit that permits printing by the printer, wherein:
the print permission circuit permits the printing by the printer when a sum of the printing amount managed by the printing amount managing circuit and an amount of change to be generated in the printing amount by printing to be performed by the printer falls within an amount of permission; and
the print permission circuit permits the printing by the printer based on the amount of change according to the designated hue before the drawing data creating circuit fixes the job hue when the printing amount is less than the amount of permission by a specific amount or more.

3. The image forming apparatus according to claim 1, wherein the printing amount managing circuit, with the job hue having been fixed, judges whether the job hue differs from the designated hue, and when having judged the job hue to differ from the designated hue, corrects the printing amount according to the job hue, and when having judged the job hue to be the same as the designated hue, does not correct the printing amount according to the job hue.

4. The image forming apparatus according to claim 1, wherein the designated hue is either color or monochrome, the job hue is either color or monochrome, and the printing amount managing circuit manages printing amount for color printing and printing amount for monochrome printing.

5. The image forming apparatus according to claim 1, wherein the printing amount managing circuit changes the printing amount based on printing-sheet count and designated hue specified in the print data, and after the printing amount is changed, with the job hue having been fixed, corrects the printing amount based on drawing-data sheet count and on job hue.

6. A non-transitory computer-readable recording medium storing an image forming program, the image forming program causing an image forming apparatus that includes a printer executing printing on a printing medium to function as:
a drawing data creating circuit that by rasterizing and color-converting print data creates drawing data from print data, the drawing data causing the printer to perform printing;
a medium supply circuit that supplies the printing medium to the printer; and
a printing amount managing circuit that manages a printing amount; wherein
the medium supply circuit performs
a primary supply supplying the printing medium to a specific position, the medium supply circuit starting the primary supply prior to the drawing data creating circuit completing creation of drawing data, and
a secondary supply supplying the printing medium from the specific position to the printer, the medium supply circuit starting the secondary supply prior to the drawing data creating circuit completing creation of the drawing data;
the drawing data creating circuit in creating the drawing data fixes a job hue within the drawing data in printing, the printing being performed by the printer based on the drawing data;
the printing amount managing circuit changes the printing amount according to a designated hue specified in the print data before the drawing data creating circuit fixes the job hue when the printing amount needs to be changed to start the primary supply; and the printing amount managing circuit, with the job hue having been fixed, corrects the printing amount according to the job hue after the printing amount is changed according to the designated hue.

7. The non-transitory computer-readable recording medium according to claim 6, wherein the printing amount managing circuit, with the job hue having been fixed, judges whether the job hue differs from the designated hue, and when having judged the job hue to differ from the designated hue, corrects the printing amount according to the job hue, and when having judged the job hue to be the same as the designated hue, does not correct the printing amount according to the job hue.

8. The non-transitory computer-readable recording medium according to claim 6, wherein the designated hue is either color or monochrome, the job hue is either color or monochrome, and the printing amount managing circuit manages printing amount for color printing and printing amount for monochrome printing.

9. The non-transitory computer-readable recording medium according to claim 6, wherein the printing amount managing circuit changes the printing amount based on printing-sheet count and designated hue specified in the print data, and after the printing amount is changed, with the job hue having been fixed, corrects the printing amount based on drawing-data sheet count and on job hue.

\* \* \* \* \*